United States Patent
Wu

(10) Patent No.: US 8,627,121 B2
(45) Date of Patent: Jan. 7, 2014

(54) USB-ON-THE-GO BI-DIRECTIONAL PROTECTION CIRCUIT

(75) Inventor: Hai-Zhou Wu, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 359 days.

(21) Appl. No.: 13/078,850

(22) Filed: Apr. 1, 2011

(65) Prior Publication Data
US 2012/0153908 A1   Jun. 21, 2012

(30) Foreign Application Priority Data
Dec. 16, 2010   (CN) .......................... 2010 1 0591308

(51) Int. Cl.
*G06F 1/26*   (2006.01)
(52) U.S. Cl.
USPC ........................................................ 713/300
(58) Field of Classification Search
USPC ........................................................ 713/300
See application file for complete search history.

(56) References Cited

U.S. PATENT DOCUMENTS

| 2006/0261788 | A1* | 11/2006 | May | 323/273 |
| 2008/0119159 | A1* | 5/2008 | Ruff et al. | 455/343.1 |
| 2010/0064153 | A1* | 3/2010 | Gk et al. | 713/310 |

* cited by examiner

*Primary Examiner* — Thomas Lee
*Assistant Examiner* — Danny Chan
(74) *Attorney, Agent, or Firm* — Altis Law Group, Inc.

(57) ABSTRACT

A power management circuit for managing power of an electronic device includes a regulator and a protection circuit. The regulator converts an input voltage into a corresponding rated voltage and includes an enable pin and an output pin. The enable pin receives a voltage signal to enable or disable the regulator, and the output pin selectively outputs the rated voltage. When the electronic device is implemented as a slave universal serial bus (USB) device and the enable pin receives a low voltage signal, the regulator is disabled, and the protection circuit receives an output voltage. When the electronic device is implemented as a USB host and the enable pin receives a high voltage signal, the regulator is enabled, and the output protection circuit outputs the rated voltage.

18 Claims, 2 Drawing Sheets

USB-ON-THE-GO BI-DIRECTIONAL PROTECTION CIRCUIT

BACKGROUND

1. Technical Field

The disclosure generally relates to power management technology, and more particularly to a power management circuit used in an electronic device.

2. Description of the Related Art

Universal serial bus (USB) can be used to establish communication between a USB host (usually a desktop or notebook computer) and a slave USB device (e.g., a digital audio player or mobile phone), but two slave USB devices cannot be used in this method. Thus, USB on-the go (OTG) technology is used to allow communication devices that generally fulfill the role of being slave USB devices to be USB hosts when paired with another USB device. For example, a digital camera can be directly connected to a printer through the USB OTG.

To prevent over voltage and protect charging circuits, over voltage protection (OVP) integrated circuits (ICs) are commonly used in the slave USB devices. However, many OVP ICs are not compatible with the USB OTG, and so communication between the two slave devices cannot be achieved.

Therefore, there is room for improvement within the art.

BRIEF DESCRIPTION OF THE DRAWINGS

Many aspects of an exemplary power management circuit and electronic device employing the same can be better understood with reference to the following drawings. The components in the drawings are not necessarily drawn to scale, the emphasis instead being placed upon clearly illustrating the principles of the exemplary power management circuit and electronic device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
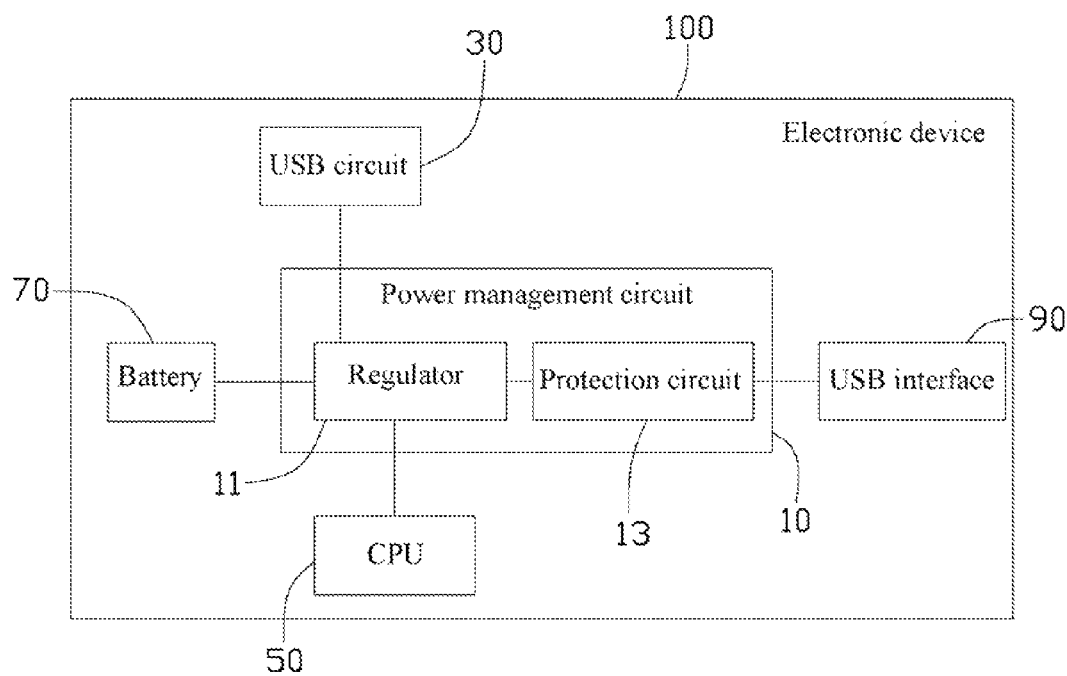
FIG. 1 is a block diagram of an electronic device including a power management circuit, according to an exemplary embodiment of the disclosure.

FIG. 1 shows an electronic device 100 including a power management circuit 10, according to an exemplary embodiment of the disclosure. The electronic device 100 can be a mobile phone, a personal digital assistant, or other electronic device. The electronic device 100 further includes a universal serial bus (USB) circuit 30, a central processing unit (CPU) 50, a battery 70, and a USB interface 90. The power management circuit 10 is in electrical connection with the USB circuit 30, the CPU 50, the battery 70 and the USB interface 90. The electronic device 100 has USB on-the-go (OTG) function, and can be implemented as a USB host to provide power for other electronic device (not shown) or be implemented as a slave USB device to receive power from other electronic device.

The power management circuit 10 includes a regulator 11 and a protection circuit 13 electrically connected to the regulator 11. The regulator 11 is electrically connected to the USB circuit 30, the battery 70, and the CPU 50. The protection circuit 13 is electrically connected to the USB interface 90. In this exemplary embodiment, the regulator 11 can be a constant voltage regulator, when the electronic device 100 is implemented as a USB host, the regulator 11 outputs a rated voltage (e.g., 5V) to the USB circuit 30 and to a slave USB device, such as a mobile phone, through the USB interface 90. When the electronic device 100 is implemented as a slave USB device, the protection circuit 13 receives and transmits an output voltage (e.g., 5V) from a USB host such as a mobile phone to the USB circuit 30.

Figure 2:
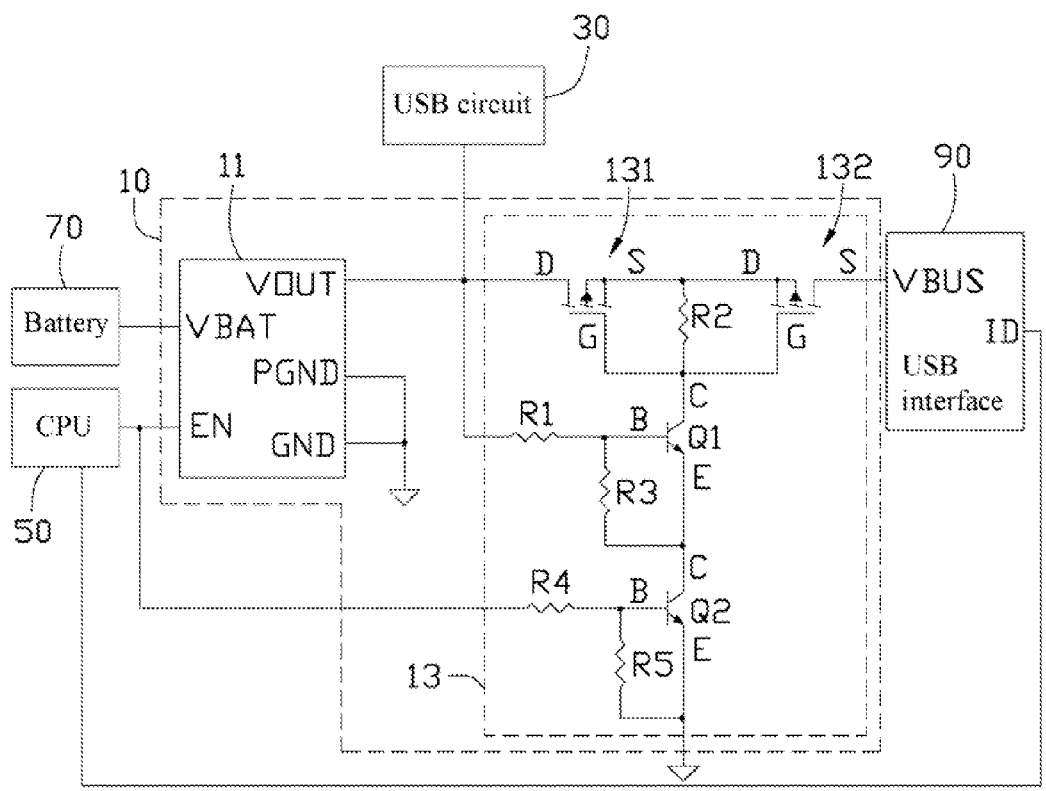
FIG. 2 is a circuit view of the power management circuit of the electronic device, according to the exemplary embodiment of the disclosure.

Also referring to FIG. 2, the regulator 11 is capable of converting an output voltage of the battery 70 into a corresponding rated voltage (e.g., 5V) for the USB circuit 30 and maintaining a constant voltage level. In this exemplary embodiment, the electronic device 100 is a mobile phone, and the output voltage of the battery 70 can be about 3.7V. The regulator 11 can be a TPS61026 direct current (DC)/DC integrated circuit (IC), which can step up voltages. For example, the regulator 11 steps up the output voltage (e.g., 3.7V) of the battery 70 to a rated voltage (e.g., 5V), powering the USB circuit 30 and the protection circuit 13.

The regulator 11 includes an enable pin EN, a power pin VBAT, two ground pins PGND and GND, and an output pin VOUT. The enable pin EN is electrically connected to the CPU 50. In this exemplary embodiment, the enable pin EN is activated by a high level signal (e.g., logical 1) and can enable or disable the regulator 11. For example, when the enable pin EN receives a low voltage signal such as logical 0 from the CPU 50, the regulator 11 is disabled. When the enable pin EN receives a high voltage signal, such as logical 1, the regulator 11 is enabled and activated.

The power pin VBAT is electrically connected to the battery 70 to receive and transmit power, the output pin VOUT is electrically connected to the protection circuit 13 to output a constant voltage. The ground pins PGND and GND are electrically connected to ground. In this exemplary embodiment, the output pin VOUT can output a 5V rated voltage to the USB circuit 30 and the protection circuit 13.

The protection circuit 13 includes a first field effect transistor (FET) 131, a second FET 132, a plurality of resistors, a first transistor Q1, and a second transistor Q2. The resistors includes a first bias resistor R1, a second bias resistor R2, a third bias resistor R3, a fourth bias resistor R4, and a fifth bias resistor R5. The first FET 131 can be a p-type metal oxide semiconductor (PMOS) FET and includes a drain D, a source S and a gate G. When the voltage at the drain D is greater than the voltage at the gate G, the first FET 131 is switched on. The drain D of the first FET 131 is electrically connected to the output pin VOUT, and the second bias resistor R2 is electrically connected between the source S and the gate G of the first FET 131.

The second FET 132 can be a PMOSFET and includes a drain D, a source S, and a gate G. When the voltage at the drain D is greater than at the gate G of the second FET 132, the second FET 132 is switched on. The drain D of the second FET 132 is electrically connected to the source S of the first FET 131, the source S of the second FET 132 is electrically connected to the USB interface 90, and the second bias resistor R2 is electrically connected between the drain D and the gate G of the second FET 132.

The first transistor Q1 can be an npn transistor and includes an emitter E, a base B, and a collector C. The base B is electrically connected to the USB circuit 30 and the output pin VOUT through the first bias resistor R1. The collector C of the first transistor Q1 is electrically connected to the second bias resistor R2 and the gates G of the first FET 131 and the second FET 132. The third bias resistor R3 is electrically connected between the base B and the emitter E of the first transistor Q. The second transistor Q2 can be an npn transistor and includes a base B, an emitter E, and a collector C. The collector C of the second transistor Q2 is electrically connected to the emitter E of the first transistor Q1. The base B of the second transistor Q2 is electrically connected to the CPU 50 and the enable pin EN through the fourth bias resistor R4. The emitter E of the second transistor Q2 is electrically connected to ground, and the fifth bias transistor R5 is electrically connected between the base B and the emitter E of the second transistor Q2.

The USB circuit 30 includes inductors, capacitors and resistors, and is capable of filtering noise signals and protecting the power management circuit 10. The CPU 50 carries out each operation instruction of the electronic device 100 in sequence, to perform the basic arithmetic, logical and input/output (I/O) operations. In this exemplary embodiment, the CPU 50 is capable of carrying out operation instruction to control and enable the electronic device 100 to be a USB host or a slave USB device, and transmitting a high or low voltage signal to the enable pin EN of the regulator 11.

The USB interface 90 includes a power pin VBUS and an identification pin ID. The power pin VBUS is electrically connected to the source S of the second FET 132 to transfer electrical energy. The identification pin ID electrically connects the CPU 50 and is capable of communicating with electronic device and transmitting an identification signal to the CPU 50 to implement the electronic device 100 as a slave USB device or a USB host.

For example, when the identification signal is a high voltage signal such as logical 1, the electronic device 100 is implemented as a slave USB device, the CPU 50 sends a low voltage signal (e.g., logical 0) to the enable pin EN, the regulator 11 is disabled. When the identification signal is a low voltage signal such as logical 0, the electronic device 100 is implemented as a USB host, the CPU 50 sends a high voltage signal (e.g., logical 1) to the enable pin EN, the regulator 11 then is enabled and outputs a rated voltage (e.g., 5V) to the USB circuit 30 and the protection circuit 13 through the output pin VOUT.

Further referring to FIGS. 1 and 2, in use, the USB interface 90 is electrically connected to another electronic device such as a mobile phone, when the CPU 50 detects a high voltage signal (e.g., logical 1) from the identification pin ID, the electronic device 100 is implemented as a slave USB device, and the other electronic device is implemented as a USB host. The CPU 50 sends a low voltage signal to the enable pin EN, disabling the regulator 11, the first transistor Q1 and the second transistor Q2 are turned off, and the first FET 131 and the second FET 132 are turned on. The protection circuit 13 receives an output voltage (e.g., 5V) through the USB interface 90 from the USB host to provide power to the USB circuit 30 and the electronic device 100.

When the CPU 50 detects a low voltage signal, such as logical 0, from the identification pin ID, the electronic device 100 is implemented as a USB host, and the other electronic device is implemented as a slave USB device. The CPU 50 sends a high voltage signal to the enable pin EN, enabling and activating the regulator 11. The regulator 11 steps up the output voltage (e.g., 3.7V) of the battery 70 to a rated voltage (e.g., 5V), powering the USB circuit 30 and the protection circuit 13. The first transistor Q1 and the second transistor Q2 are turned on by a bias voltage, and the first FET 131 and the second FET 132 are turned on by a bias voltage. Thus, the rated voltage (e.g., 5V) from the output pin VOUT is transmitted to the USB circuit 30 and the slave USB device through the protection circuit 13 and the USB interface 90.

In summary, the electronic device 100 can be implemented as a slave USB device or a USB host based on the USB OTG, so the electronic device 100 can be charged and provide communication with other electronic devices. Additionally, the power management circuit 10 can adjust and control the changes of voltage that charge the electronic device 100, which can prevent overvoltage protection and protect a charging circuit.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A power management circuit for an electronic device, comprising:
   a regulator that converts an input voltage into a corresponding rated voltage, the regulator comprising:
      an enable pin that receives a voltage signal to enable or disable the regulator according to the voltage signal; and
      an output pin that selectively outputs the rated voltage; and
   a protection circuit electrically connected to the output pin, wherein when the electronic device is implemented as a slave universal serial bus (USB) device and the enable pin receives a low voltage signal, the regulator is disabled, and the protection circuit receives an output voltage; when the electronic device is implemented as a USB host and the enable pin receives a high voltage signal, the regulator is enabled, and the output protection circuit outputs the rated voltage; the protection circuit comprises a first field effect transistor (FET), a second FET, a first bias resistor, and a second bias resistor, the drain of the first FET is electrically connected to the output pin, the second bias resistor is electrically connected between the source and the gate of the first FET, the drain of the second FET is electrically connected to the source of the first FET, and the second bias resistor is electrically connected between the drain and the gate of the second FET.

2. The power management circuit as claimed in claim 1, wherein the regulator is a direct current (DC)/DC integrated circuit and is capable of converting a voltage into the corresponding rated voltage and maintaining a constant voltage level.

3. The power management circuit as claimed in claim 1, wherein the regulator further comprises a power pin and two ground pins, the enable pin is activated by a high voltage signal, the power pin is electrically connected to a battery to receive power, and the ground pins are electrically connected to ground.

4. The power management circuit as claimed in claim 1, wherein the protection circuit further comprises a first transistor and a third bias resistor, the base is electrically connected to the output pin through the first bias resistor, the collector of the first transistor is electrically connected to the second bias resistor and the gates of the first FET and the second FET, the third bias resistor is electrically connected between the base and the emitter of the first transistor.

5. The power management circuit as claimed in claim 4, wherein the protection circuit further comprises a second transistor, a fourth resistor and a fifth resistor, the collector of the second transistor is electrically connected to the emitter of the first transistor, the base of the second transistor is electrically connected to the enable pin through the fourth bias resistor, the emitter of the second transistor is electrically connected to ground, and the fifth bias transistor is electrically connected between the base and the emitter of the second transistor.

6. The power management circuit as claimed in claim 5, wherein when the enable pin receives a low voltage signal, the regulator is disabled, the first transistor and the second transistor are turned off, and the first FET and the second FET are turned on; when the enable pin receives a high voltage signal, the regulator is enabled and activated, the regulator steps up the output voltage to the rated voltage, the first transistor and the second transistor are turned on, and the first FET and the second FET are turned on.

7. The power management circuit as claimed in claim 5, wherein the regulator is a constant voltage regulator, the first FET and the second FET are p-type metal oxide semiconductor FETs (PMOSFETs), and the first transistor and the second transistor are npn transistors.

8. An electronic device, comprising:
a central processing unit;
a USB interface; and
a power management circuit that manages power of the electronic device, the power management circuit comprising:
a regulator that converts a voltage into a corresponding rated voltage, the regulator comprising:
an enable pin that electrically connects the CPU, the enable pin receiving a voltage signal to activate or disable the regulator; and
an output pin that selectively outputs the rated voltage; and
a protection circuit electrically connected to the output pin, wherein the USB interface electrically connects the other electronic device and sends a voltage signal to the CPU, when the CPU detects a high voltage signal, the electronic device is used as a slave USB device and sends a low voltage signal to the enable pin, the regulator is disabled, and the protection circuit receives an voltage through the USB interface from the other electronic device; when the CPU detects a low voltage signal from the USB interface, the electronic device is used as a USB host and sends a high voltage signal to the enable pin, the regulator is activated, and the output protection circuit outputs the rated voltage to the USB interface to the other electronic device; the protection circuit comprises a first field effect transistor (FET), a second FET, a first bias resistor, and a second bias resistor, the drain of the first FET is electrically connected to the output pin, the second bias resistor is electrically connected between the source and the gate of the first FET, the drain of the second FET is electrically connected to the source of the first FET, the source of the second FET is electrically connected to the USB interface, and the second bias resistor is electrically connected between the drain and the gate of the second FET.

9. The electronic device as claimed in claim 8, wherein the regulator is a direct current (DC)/DC integrated circuit and is capable of converting an output voltage of a battery of the electronic device into the corresponding rated voltage and maintaining a constant voltage level.

10. The electronic device as claimed in claim 9, wherein the regulator further comprises a power pin and two ground pins, the enable pin is activated by a high voltage signal, the power pin is electrically connected to the battery to receive and transmit power, and the ground pins are electrically connected to ground.

11. The electronic device as claimed in claim 8, wherein the protection circuit further comprises a first transistor and a third bias resistor, the base is electrically connected to the output pin through the first bias resistor, the collector of the first transistor is electrically connected to the second bias resistor and the gates of the first FET and the second FET, the third bias resistor is electrically connected between the base and the emitter of the first transistor.

12. The electronic device as claimed in claim 11, wherein the protection circuit further comprises a second transistor, a fourth resistor and a fifth resistor, the collector of the second transistor is electrically connected to the emitter of the first transistor, the base of the second transistor is electrically connected to the CPU and the enable pin through the fourth bias resistor, the emitter of the second transistor is electrically connected to ground, and the fifth bias transistor is electrically connected between the base and the emitter of the second transistor.

13. The electronic device as claimed in claim 12, wherein when the enable pin receives a low voltage signal from the CPU, the regulator is disabled, the first transistor and the second transistor are turned off, and the first FET and the second FET are turned on; when the enable pin receives a high voltage signal from the CPU, the regulator is enabled and activated, the regulator steps up the output voltage to the rated voltage, the first transistor and the second transistor are turned on, and the first FET and the second FET are turned on.

14. The electronic device as claimed in claim 12, wherein the regulator is a constant voltage regulator, the first FET and the second FET are p-type metal oxide semiconductor FETs (PMOSFETs), and the first transistor and the second transistor are npn transistors.

15. The electronic device as claimed in claim 8, further comprising a USB circuit electrically connected to the regulation unit and the protection circuit, wherein the USB circuit is capable of filtering noise signals and protecting the power management circuit.

16. The electronic device as claimed in claim 8, wherein the USB interface comprises a power pin and an identification pin, the power pin is electrically connected to the source of the second FET to transfer power, the identification pin electrically connects the CPU and is capable of transmitting an identification signal to the CPU to implement the electronic device as a slave USB device or a USB host.

17. The electronic device as claimed in claim 16, wherein when the identification signal is a high voltage signal, the electronic device is implemented as a slave USB device, the CPU sends a low voltage signal to the enable pin EN, the regulator is disabled; when the identification signal is a low voltage signal, the electronic device is implemented as a USB host, the CPU sends a high voltage signal to the enable pin, the regulator is activated and outputs a rated voltage to the protection circuit through the output pin.

18. The electronic device as claimed in claim 17, wherein the high voltage signal and low voltage signal correspond to logical 1 and logical 0, respectively.

* * * * *